(12) United States Patent
Schmoeger

(10) Patent No.: US 9,552,938 B2
(45) Date of Patent: *Jan. 24, 2017

(54) RUBBER MAT KEYBOARD, PARTICULARLY A SILICONE MAT KEYBOARD

(71) Applicant: PrehKeyTec GmbH, Mellrichstadt (DE)

(72) Inventor: Klaus Schmoeger, Bad Neustadt (DE)

(73) Assignee: PrehKeyTec GmbH, Mellrichstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,267

(22) Filed: Jun. 8, 2015

(65) Prior Publication Data

US 2015/0270077 A1  Sep. 24, 2015

Related U.S. Application Data

(63) Continuation of application No. PCT/EP2013/074745, filed on Nov. 26, 2013.

(30) Foreign Application Priority Data

Dec. 7, 2012 (DE) .................... 20 2012 104 777 U

(51) Int. Cl.
| | |
|---|---|
| B41J 5/00 | (2006.01) |
| H01H 13/704 | (2006.01) |
| G06F 3/02 | (2006.01) |
| H01H 13/86 | (2006.01) |
| H01H 13/82 | (2006.01) |

(52) U.S. Cl.
CPC .......... *H01H 13/704* (2013.01); *G06F 3/0202* (2013.01); *G06F 3/0219* (2013.01); *H01H 13/86* (2013.01); *H01H 13/82* (2013.01); *H01H 2209/026* (2013.01); *H01H 2213/01* (2013.01); *H01H 2223/002* (2013.01); *H01H 2229/032* (2013.01); *H01H 2231/006* (2013.01); *H01H 2239/008* (2013.01); *H01H 2239/034* (2013.01); *H01H 2239/038* (2013.01)

(58) Field of Classification Search
CPC ....................................... H01H 13/82
USPC ....................................... 400/472
See application file for complete search history.

(56) References Cited

U.S. PATENT DOCUMENTS

| | | | | |
|---|---|---|---|---|
| 5,438,331 A | * | 8/1995 | Gilligan ................ | G06F 3/0235 341/20 |
| 6,121,563 A | * | 9/2000 | Hochgesang .......... | H01H 3/122 200/343 |

(Continued)

FOREIGN PATENT DOCUMENTS

| | | |
|---|---|---|
| DE | 20 2007 003 350 U1 | 7/2007 |
| DE | 20 2007 017 430 U1 | 4/2008 |

(Continued)

*Primary Examiner* — Anthony Nguyen
(74) *Attorney, Agent, or Firm* — Muncy, Geissler, Olds & Lowe, P.C.

(57) ABSTRACT

A data entry and/or operating system, particularly a keyboard, also a POS keyboard, includes a lower part and an upper part as well as at least one circuit board and at least one retainer plate, the retainer plate lying on the lower part. One or more bushings are integrated for the purpose of connecting the circuit board to the retainer plate. The upper part is formed from a rubber mat having keys, and the stability of the keyboard is assured by the circuit board, bushing and metal retainer sheet. The lower part is connected to the upper part in a sealed manner.

19 Claims, 1 Drawing Sheet

(56) References Cited

U.S. PATENT DOCUMENTS

| | | | |
|---|---|---|---|
| 6,965,076 B2 * | 11/2005 | Wu | G06F 3/0202 174/541 |
| 7,014,377 B2 * | 3/2006 | Yamauchi | H01H 13/702 200/314 |
| 7,589,293 B2 * | 9/2009 | Yeh | H01H 13/82 200/512 |
| 7,723,631 B2 | 5/2010 | Purcocks | |
| 8,779,313 B2 | 7/2014 | Su | |
| 9,111,703 B2 * | 8/2015 | Whitt, III | H01H 13/704 |
| 2005/0000789 A1 * | 1/2005 | Yoneyama | H01H 13/82 200/512 |
| 2006/0225995 A1 | 10/2006 | Ohnishi | |
| 2009/0126186 A1 * | 5/2009 | Wu | H01H 13/704 29/622 |
| 2009/0236206 A1 | 9/2009 | Wennemer et al. | |
| 2009/0308722 A1 | 12/2009 | Hsu et al. | |
| 2010/0059347 A1 | 3/2010 | Tang et al. | |
| 2010/0111585 A1 * | 5/2010 | Tsai | G06F 3/0202 400/472 |
| 2010/0187079 A1 * | 7/2010 | Dumont | H01H 13/83 200/341 |
| 2011/0005908 A1 | 1/2011 | Lin et al. | |
| 2012/0160655 A1 * | 6/2012 | Takai | H01H 13/82 200/513 |

FOREIGN PATENT DOCUMENTS

| | | |
|---|---|---|
| DE | 60 2004 011 111 T2 | 12/2008 |
| DE | 20 2009 013 481 U1 | 12/2010 |
| DE | 20 2010 008 809 U1 | 3/2011 |
| GB | 2469358 A | 10/2010 |
| KR | 10-2011-0035051 A | 4/2011 |

\* cited by examiner

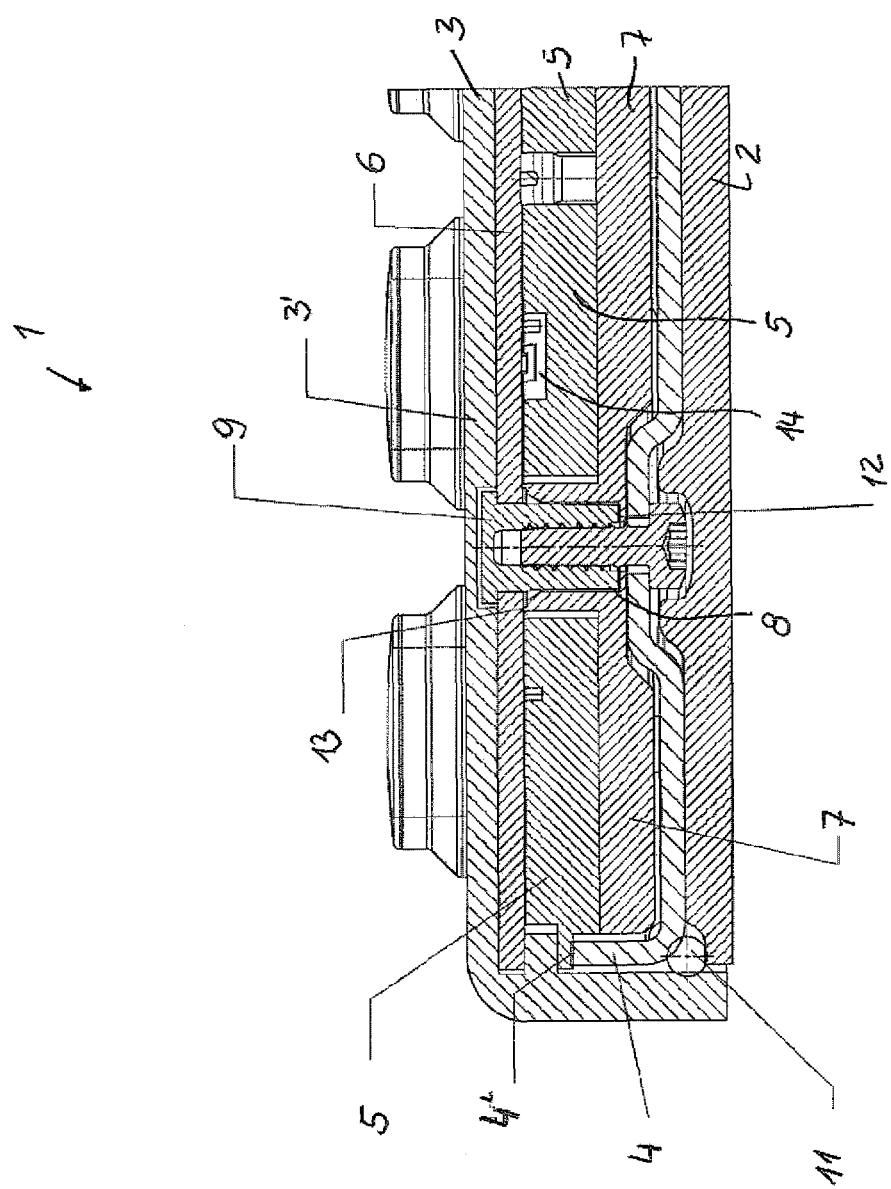

RUBBER MAT KEYBOARD, PARTICULARLY A SILICONE MAT KEYBOARD

This nonprovisional application is a continuation of International Application No. PCT/EP2013/074745, which was filed on Nov. 26, 2013, and which claims priority to German Patent Application No. 20 2012 104 777.2, which was filed in Germany on Dec. 7, 2012 and which are both herein incorporated by reference.

BACKGROUND OF THE INVENTION

Field of the Invention

The present invention relates to a data entry and/or operating system, particularly a keyboard, as well as a POS keyboard, for use under harsh environmental conditions, i.e., a keyboard with higher levels of protection or a keyboard that satisfies the higher levels of protection, particularly vibration, shock, ESD, etc.

Description of the Background Art

Keyboards that are dustproof and waterproof are already available. Thus, DE 20 2007 003 350 U1 describes a dustproof and waterproof keyboard with an outer covering that is completely sealed and for its part possesses antimicrobial properties. DE 20 2010 008 809 U1 discloses a waterproof keyboard with an LED backlight. In this case, a keyboard plate, forming a plurality of keys, is made as a single piece and is airtight and waterproof. To equalize the air pressure, the base plate of the keyboard has at least one air hole for equalizing the air pressure. DE 60 2004 011 111 T2 (EP 1 697 952 B1), which corresponds to U.S. Pat. No. 7,723,631, published a further waterproof keyboard.

SUMMARY OF THE INVENTION

It is therefore an object of the present invention to provide a keyboard that satisfies higher levels of protection such as vibration, shock, ESD, etc.

The object is achieved in an embodiment by a rubber mat keyboard, which fulfills the extreme vibration, shock, and ESD requirements.

The invention is based on the idea of meeting the damping and vibration requirements in that, on the one hand, impacts and collisions are absorbed in the interior via damping elements. The ESD requirements are fulfilled in that all conductive parts are or become insulated from one another.

The idea is implemented by the use of one or more bushing/s, that can be made of plastic, which is/are pressed into at least one printed circuit board. The plastic realizes an insulation of the screw from the printed circuit board and thus assures said insulation. In addition, a certain elasticity of the screw connection is achieved. A retainer plate used for reinforcement is screwed together with the bushing/bushings. Bent or curved edges/curvatures of the retainer plate are braced by/via the screw connection with circumferential protective mats, preferably silicone mats, and thus used as a damping member for vibrations. The conductive metal plate is moreover insulated without gaps from the printed circuit board(s) by this measure.

An elastic mat, which is likewise braced by the screw connection and on which a cylindrical cover is situated in the direction of the printed circuit board, is located between the plastic bushings and the retainer plate. As a result, here as well vibrations and impacts are dampened and an insulation or reduction of the air paths to the printed circuit board with respect to ESD is achieved.

In an embodiment of the invention, a protective mat made of an elastic material is preferably adhesively bonded to the printed circuit board in the interior. The components (printed circuit board) are recessed as little as possible in it with consideration of tolerances. Furthermore, air channels are created to assure a venting of the keys relative to one another. Furthermore, an intermediate mat, likewise made of silicone, which seals all spaces between the protective mat and the retainer plate as much as possible, is placed on said protective mat. Silicone is preferably selected as the material, because it entails barely any tool costs and the cost of parts can be kept low as a result. Furthermore, because of their elasticity, they can assure a small reduction of pressure in the interior due to changes in volume.

The stability of the keyboard itself is realized via a skeletal frame formed of the printed circuit board(s), bushing(s), and the retainer plate. Said framework is held in place via the silicon mat with keys, the protective mat(s), and the intermediate mat(s).

As a consequence of the invention, therefore, the requirements of a cost-effective and installation-friendly invention are merged and optimally implemented. The required rigidity of the entire system is assured, whereas the fastening elements have a certain elasticity.

The use of silicone mats in keyboards is known. Thus, DE 20 2011 101 812 U1 describes a keyboard for a data input device, with a keypad comprising a plurality of long travel keys arranged laterally above and below one another. The surface has a completely sealed silicone mat with dome-shaped keys formed at a defined position. A circumferential edge for receiving a pressure plate with a plunger is arranged on the inner side of the dome-shaped keys. DE 20 2009 013 481 U1 describes a keyboard for a data processing device. A plurality of keys are designed as a one-piece and cover-like flexible molded elastomeric part, particularly as a molded silicone part. The aforementioned keyboards are not suitable, however, for use in a harsh environment. DE 20 2010 004 741 U1 for its part describes a keyboard for use in hygiene-intensive areas with a base body with an electronic subassembly, comprising circuit elements, and a cover formed as key frame. The key frame is locked releasably by means of a quick locking system in a recess of the base body. The electronic subassembly is sealed by a covering silicone layer. Although said keyboard is adapted to various environmental conditions, it is not suitable for excluding vibration, shock, ESD, etc., during further use.

A so-called (rubber) flat input keyboard for data processing devices and a method for the production thereof are described in DE 44 98 145 C1, which corresponds to U.S. Pat. No. 5,748,114. Said keyboard can be rolled up and unrolled but is not suitable for use under harsh environmental conditions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, are not limitive of the present invention, and wherein the sole figure illustrates a keyboard according to an exemplary embodiment.

DETAILED DESCRIPTION

The single figure shows a data input and/or operating system, particularly a keyboard, here an intrinsically stable rubber keyboard, which is illustrated in section and labeled with 1. The data input and/or operating system 1, called a keyboard 1 below, has of a lower part 2 and an upper part 3. Lower part 2, which serves as the bottom of the keyboard, can be made preferably of a rubber material such as silicone. Upper part 3 is formed by a rubber mat 3' with key(s). Silicone is preferably used as the rubber. For a desired imperviousness, upper and lower parts 3, 2 are connected sealingly to one another (11) by means of an adhesive introduced circumferentially, e.g., a silicone adhesive. Other types of sealing connections such as clamps, etc., are also possible.

At least one retainer plate 4, preferably made as a single piece, at least one or more protective mats 5 above one another or next to one another, and at least one printed circuit board 6 are placed between lower part 2 and upper part 3. Retainer plate 4, for example, a metal sheet, is used preferentially for reinforcing keyboard 1. Retainer plate(s) 4 preferably has/have circumferential or bent edges 4'.

Individual intermediate mats 7, alternatively also designed as a one-piece mat with feed-throughs 8, if this seems necessary, can be integrated, moreover, into keyboard 1. They can be mounted between retainer plate 4 and the one or more protective mats 5. Intermediate mat(s) 7 and protective mat(s) 5 can be made of silicone. They are used, inter alia, for damping/ESD, whereby for this purpose intermediate mat 7 dampens in area 13 in relation to printed circuit board 6 and in area 12 in which retainer plate 4 is pressed into intermediate mat 7 against bushing 9. Intermediate mat(s) 7 can be formed so that protective mat 5 comes to lie in them, at least partially laterally sealingly therewith. In this case, protective mat 5 is placed on/in intermediate mat 7, which seals as much as possible all spaces between protective mat 5 and retainer plate 4.

One or more plastic bushings 9 take over the connection of the individual parts of retainer plate(s) 4, intermediate mats 7, protective mat 5, and printed circuit board 6. By means of this connection, retainer plate 4 is pressed into intermediate mat(s) 7 and retainer plate(s) 4 into protective mat(s) 5. Protective mat(s) 5 for its/their part can be pulled onto/over edges 4' of retainer plate(s) 4. Intermediate mat(s) 7 has/have at least one rib 7', which projecting upwardly at plastic bushing(s) 9 lies against it/them circumferentially. The insulation or the extent of the insulation to printed circuit board 6 is increased by this upright rib 7'.

Air channels 14 are provided for ventilating the keys relative to one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A data input and/or operating system, comprising:
a lower part;
an upper part;
at least one printed circuit board;
at least one retainer plate that that lies on the lower part; and
one or more bushings integrated for connecting the printed circuit board with the retainer plate,
wherein the upper part is formed by a rubber mat with keys,
wherein a stability of the keyboard is realized by the printed circuit board, the bushing, and the retainer plate, and
wherein the lower part is connected sealingly to the upper part.

2. The data input and/or operating system according to claim 1, wherein the retainer plate is made of a metal sheet.

3. The data input and/or operating system according to claim 1, wherein the retainer plate has a circumferential or bent edge.

4. The data input and/or operating system according to claim 1, wherein at least one or more protective mats are integrated between the retainer plate on the lower part and the upper part.

5. The data input and/or operating system according to claim 1, wherein an intermediate mat is integrated between the retainer plate and the printed circuit board.

6. The data input and/or operating system according to claim 5, wherein the intermediate mat and the protective mats are formed of silicone.

7. The data input and/or operating system according to claim 5, wherein the intermediate mat substantially seals all spaces between the protective mats and the retainer plate.

8. The data input and/or operating system according to claim 5, wherein the intermediate mat has at least one rib, which lies circumferentially against the bushing.

9. The data input and/or operating system according to claim 1, wherein the bushing is formed of plastic.

10. The data input and/or operating system according to claim 1, wherein the data input and/or operating system is a keyboard.

11. The data input and/or operating system according to claim 1, wherein the data input and/or operating system is a POS keyboard.

12. The data input and/or operating system according to claim 1, wherein the lower part and the upper part are made of silicone.

13. The data input and/or operating system according to claim 1, wherein the retainer plate has bent edges that extend upwards towards the upper part.

14. The data input and/or operating system according to claim 1, wherein the lower part and the upper part are adhered together such that the data input and/or operating system is impervious.

15. The data input and/or operating system according to claim 5, wherein in a cross-sectional view of the data input and/or operating system, the retainer plate is provided between the lower part and the intermediate mat, the intermediate mat is provided between the retainer plate and the protective mats, the protective mats are provided between the intermediate mat and the printed circuit board and the printed circuit board is provided between the protective mats and the upper part.

16. The data input and/or operating system according to claim 5, wherein the bushings each extend through aligned openings in the printed circuit board and the intermediate mat.

17. The data input and/or operating system according to claim 16, wherein an upper end of each of the bushings is recessed in a lower surface of the upper part.

18. The data input and/or operating system according to claim 16, wherein a screw is inserted inside each of the bushings, each screw extending through an opening in the retainer plate, such that the printed circuit board is connected with the retainer plate.

19. The data input and/or operating system according to claim 18, wherein a head of each screw is recessed in an upper surface of the lower part.

\* \* \* \* \*